US008720629B2

(12) United States Patent
Sohn et al.

(10) Patent No.: US 8,720,629 B2
(45) Date of Patent: May 13, 2014

(54) POWER CONTROL APPARATUS AND POWER CONTROL METHOD OF CONSTRUCTION MACHINE

(75) Inventors: Won Sun Sohn, Seoul (KR); Duck Woo Park, Incheon (KR); Jae Seok Bang, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/518,743

(22) PCT Filed: Dec. 22, 2010

(86) PCT No.: PCT/KR2010/009207
§ 371 (c)(1), (2), (4) Date: Jun. 22, 2012

(87) PCT Pub. No.: WO2011/078578
PCT Pub. Date: Jun. 30, 2011

(65) Prior Publication Data

US 2012/0251332 A1 Oct. 4, 2012

(30) Foreign Application Priority Data

Dec. 24, 2009 (KR) ........................ 10-2009-0130425
Dec. 24, 2009 (KR) ........................ 10-2009-0130426

(51) Int. Cl.
*B60K 31/00* (2006.01)

(52) U.S. Cl.
USPC ........................... 180/170; 180/175; 180/53.4

(58) Field of Classification Search
CPC ................................ B60K 31/00; B60K 31/06
USPC .................. 180/170, 175, 53.4; 477/109, 44; 60/286, 395, 43.1, 423, 434
See application file for complete search history.

(56) References Cited

U.S. PATENT DOCUMENTS 4,904,161 A * 2/1990 Kamide et al. .................. 60/434
4,967,557 A * 11/1990 Izumi et al. ..................... 60/423

(Continued)

FOREIGN PATENT DOCUMENTS

JP 03-164541 A 7/1991
JP 08-093520 A 4/1996
JP 10-252521 A 9/1998

OTHER PUBLICATIONS

Search Report dated Aug. 29, 2011 written in Korean with English translation attached for International Application No. PCT/KR2010/009207, filed Dec. 22, 2010, 5 pages.

*Primary Examiner* — Hau Phan
(74) *Attorney, Agent, or Firm* — John D. Veldhuis-Kroeze; Westman, Champlin & Koehler, P.A.

(57) ABSTRACT

The present disclosure provides a power control apparatus of a construction machine, including: an engine connected to a hydraulic pump to drive the hydraulic pump; and a controller for calculating an engine load ratio defined as a ratio of a load torque of the engine for an engine maximum torque calculated from an input engine target RPM, and calculating an engine RPM command value according to the engine load ratio such that the engine is driven at the target RPM to output the calculated engine load ratio and engine RPM command value to the engine.

6 Claims, 12 Drawing Sheets

(56) References Cited

U.S. PATENT DOCUMENTS

| | | | | |
|---|---|---|---|---|
| 5,155,996 | A * | 10/1992 | Tatsumi et al. | 60/431 |
| 5,406,793 | A * | 4/1995 | Maruyama et al. | 60/431 |
| 5,878,721 | A * | 3/1999 | Nakamura | 123/496 |
| 6,427,107 | B1 * | 7/2002 | Chiu et al. | 701/50 |
| 7,607,296 | B2 * | 10/2009 | Ohigashi et al. | 60/431 |
| 7,637,843 | B2 * | 12/2009 | Yamaguchi | 477/44 |
| 8,126,621 | B2 * | 2/2012 | Ishii et al. | 701/50 |
| 2007/0219048 | A1 * | 9/2007 | Yamaguchi | 477/109 |
| 2010/0170227 | A1 * | 7/2010 | Tsukada et al. | 60/286 |
| 2011/0167811 | A1 * | 7/2011 | Kawaguchi et al. | 60/395 |

* cited by examiner

POWER CONTROL APPARATUS AND POWER CONTROL METHOD OF CONSTRUCTION MACHINE

This Application is a Section 371 National Stage Application of International Application No. PCT/KR2010/009207, filed Dec. 22, 2010 and published, not in English, as WO2011/078578 on Jun. 30, 2011.

FIELD OF THE DISCLOSURE

The present disclosure relates to a power control apparatus of a construction machine such as a excavator, and more particularly, to a power control apparatus of a construction machine which controls an RPM of an engine according to a load ratio of the engine such that the engine can be constantly driven at a target RPM, thereby enhancing fuel efficiency.

Also, the present disclosures relates to a power control apparatus and a power control method of a construction machine such as an excavator, and more particularly, to a power control apparatus and a power control method of a construction machine which can gradually increase a pump requiring horse power according to a load pressure of a hydraulic pump, thereby preventing a hydraulic impact.

BACKGROUND OF THE DISCLOSURE

In general, a construction machine such as an excavator drives a plurality of working units such as a boom, an arm and a bucket by using a working fluid discharged from a variable capacity hydraulic pump directly connected to an engine.

A discharge flow rate of the hydraulic pump is controlled by various parameters so as to satisfy various conditions such as work efficiency and fuel efficiency.

In more detail, a control method of a hydraulic pump includes a working flow rate control (flow control) for controlling a discharge flow rate according to a manipulation signal input from a manipulation part, a constant horse power control for controlling a discharge flow rate of the hydraulic pump according to a discharge pressure of the hydraulic pump such that a required horse power of the hydraulic pump remains constant, and a horse power control (power shift control) for controlling a discharge flow rate of the hydraulic pump according to a load condition of an engine.

In order to perform the above-mentioned control method, the hydraulic pump is provided with a regulator, and the regulator includes a working flow rate regulating part for controlling working flow rate, a constant horse power regulating part for the constant horse power control, and a horse power regulating part for the horse power control (power shift control). The working flow rate regulating part receives a negative control pressure which is center-bypassed, a pilot pressure of the manipulation part or a load sensing pressure of each actuator and controls a discharge flow rate of the hydraulic pump. The constant horse power regulating part receives a discharge pressure (load pressure) of the hydraulic pump and controls a discharge flow rate of the hydraulic pump according to a set constant horse power line diagram. Finally, the horse power regulating part controls a discharge flow amount of the hydraulic pump according to a target engine RPM set by a dial gauge of the engine according to a load of the engine calculated from the current engine RPM.

As illustrated in FIG. 1, in the above-mentioned power control apparatus, if a manipulation of the manipulation part abruptly increases, a manipulation signal is input to the working flow rate control unit, abruptly increasing a flow rate of the hydraulic pump, and accordingly, a discharge pressure of the hydraulic pump abruptly increases, causing a required horse power of the hydraulic pump to also abruptly increase. Then, as the abruptly increased discharge pressure of the hydraulic pump is input to the constant horse power regulating part, a discharge flow rate of the hydraulic pump starts to decrease.

However, a flow rate of the hydraulic pump is reduced by the constant horse power regulating part after a predetermined time from a time point where a discharge pressure of the hydraulic pump due to a response delay time of the constant horse power regulating part. The discharge pressure of the hydraulic pump continuously increases for a time period when the constant horse power control point is delayed, generating a hydraulic impact. A section where a required horse power of the hydraulic pump abruptly increases like the section A of FIG. 1 is generated by the hydraulic impact.

In this way, as an abrupt increase of a required horse power of the hydraulic pump acts as a high load to the engine, an RPM of the engine abruptly decreases below a set target RPM. If an engine RPM is abruptly lowered in this way, exhaust fumes increase and vibrations become severe as well. In particular, in a section (turbo charger time lack section) where a drive of a turbocharger reaches a normal state as in section B of FIG. 1, an output increase rate of the engine becomes lower, further lowering the above-mentioned engine RPM and further deteriorating exhaust fumes and vibrations.

Meanwhile, if an RPM of the engine is abruptly lowered from the target RPM, the horse power regulating part lowers a driving power of the hydraulic pump from a maximum horse power (200 mA) to a minimum horse power (600 mA) to increase an RAM of the engine. Accordingly, a flow rate of a working fluid discharged from the hydraulic pump becomes lower, causing a working efficiency of the construction machine to be lowered.

FIG. 2 is a constant horse power line diagram schematically illustrating the above-mentioned process. Referring to FIG. 2, it can be seen that after a discharge pressure of the hydraulic pump abruptly increases, the flow rate and pressure returns to a constant horse power line diagram again as in line diagram C.

In summary of the problems of the above-mentioned power control apparatus according to the related art, a hydraulic impact by which a required horse power of the hydraulic pump is abruptly increased is generated due to a time delay of a constant horse power control point by the constant horse power regulating part. Accordingly, an RPM of the engine abruptly decreases, causing severe exhaust fumes and vibrations. Further, a required horse power of the hydraulic pump is abruptly lowered in a process where the horse power regulating part drives the hydraulic pump at a minimum horse power to recover an RPM of the engine to a target RPM, causing a working efficiency of the construction machine to be lowered.

In describing a horse power control of the engine in more detail, if an engine RPM is lower than a target RPM, the controller outputs a control signal to the horse power regulating part to reduce a flow rate of the hydraulic pump so that the engine RPM returns to the target RPM. Further, if a discharge flow rate of the hydraulic pump is controlled to become smaller so that the RPM of the engine becomes higher than the target RPM, a control signal is output to the horse power regulating part again to increase a flow rate of the hydraulic pump. In this way, the RPM of the engine is negatively controlled by a load of the hydraulic pump, and if an engine load ratio (a load torque of the engine to a maximum torque of the engine) becomes higher, the RPM of the engine approaches the target RPM, and if the engine load ratio becomes lower, the RPM of the engine becomes higher than the target RPM. Accordingly, even when the load transferred from the hydraulic pump to the engine is low, the engine maintains a high RPM, causing much energy loss.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the above-mentioned problem, and it is an object of the present disclosure to provide a power control apparatus of a construction machine which can constantly maintain an RPM of an engine at a target RPM, thereby enhancing fuel efficiency.

Another object of the present disclosure is to provide a hydraulic pump power control apparatus of a construction machine which can prevent generation of a hydraulic impact due to a time delay of a constant horse power control point.

Also, the other object of the present disclosure is to provide a power control apparatus of a construction machine which can prevent an abrupt decrease of an RPM of an engine even when an abrupt large manipulation is input from a manipulation part, thereby enhancing a work performance of the construction machine.

In order to achieve the above object, an aspect of the present disclosure provides a power control apparatus of a construction machine, including: an engine 10 connected to a hydraulic pump 20 to drive the hydraulic pump 20; and a controller 60 for calculating an engine load ratio defined as a ratio of a load torque of the engine for an engine maximum torque calculated from an input engine target RPM, and calculating an engine RPM command value according to the engine load ratio such that the engine is driven at the target RPM to output the calculated engine load ratio and engine RPM command value to the engine.

According to an exemplary embodiment of the present disclosure, the controller 60 includes: an engine control unit 61 for calculating the engine maximum torque from the engine target RPM, calculating the engine load torque from a fuel injection amount command value output to the engine 10, and calculating the engine load ratio from the calculated engine maximum torque and engine load torque to output the calculated engine maximum torque, engine load torque, and engine load ratio; and an equipment control unit 62 for calculating the engine RPM command value from the engine load ratio output from the engine control unit 61 to output the calculated engine RPM command value to the engine control unit 61. The engine control unit 61 calculates the fuel injection amount command value according to the engine RPM command value transmitted from the equipment control unit 62 to output the fuel injection amount command value to the engine 10.

The above-mentioned power control apparatus further includes: a horse power regulating unit 30 for varying a swash plate angle of the hydraulic pump 20 to vary a required horse power of the hydraulic pump 20; and a pressure sensor 50 for detecting a load pressure Pd of a working fluid discharged from the hydraulic pump 20. The equipment control unit 62 calculates a target pump requiring horse power from the load pressure Pd detected by the pressure sensor 50, and controls the horse power regulating unit 30 such that a required horse power of the hydraulic pump 20 gradually approaches the target pump requiring horse power for a preset time Δt.

Meanwhile, when the load pressure Pd detected by the pressure sensor 50 is a non-load pressure Pd1, the target pump requiring horse power is set to a minimum horse power POmin, if the load pressure detected by the pressure sensor 50 is a maximum set pressure Pd2, the target pump requiring horse power is set to a maximum horse power POmax, and the maximum set pressure Pd2 is set to be lower than or equal to a pressure Pd2 of a constant horse power control starting point of a maximum horse power POmax of the hydraulic pump 20.

The horse power regulating unit 30 includes: a horse power regulating part 31 for regulating the swash plate angle of the hydraulic pump 20 according to the pilot pressure input from the pilot pump 33; and an electronic proportional pressure reduction valve 32 for varying an opening degree of a passage connecting the pilot valve 33 and the horse power regulating part 31 according to a magnitude of a current command value input from the equipment control unit 62.

Another aspect of the present disclosure provides a power control apparatus of a construction machine for controlling a hydraulic pump 20 driven by an engine 10, including: a horse power regulating unit 30 for varying a swash plate angle of the hydraulic pump 20 to vary a required horse power of the hydraulic pump 20; a pressure sensor 50 for detecting a load pressure Pd of a working fluid discharged from the hydraulic pump 20; and a controller 60 for calculating a target pump requiring horse power from the load pressure Pd detected by the pressure sensor 50, and controlling a horse power regulating unit 30 such that a required horse power of the hydraulic pump 20 gradually approaches the target pump requiring horse power for a preset time Δt.

According to an exemplary embodiment of the present disclosure, when the load pressure Pd detected by the pressure sensor 50 is a non-load pressure Pd1, the target pump requiring horse power is set to a minimum horse power POmin, if the load pressure detected by the pressure sensor 50 is a maximum set pressure Pd2, the target pump requiring horse power is set to a maximum horse power POmax, and the maximum set pressure Pd2 is lower than or equal to a pressure Pd2 of a constant horse power control starting point of a maximum horse power POmax of the hydraulic pump 20.

The preset time Δt is proportional to a horse power difference value ΔPO between a current pump requiring horse power of the hydraulic pump 20 and the target pump requiring horse power.

The horse power regulating unit 30 includes: a horse power regulating part 31 for regulating the swash plate angle of the hydraulic pump 20 according to the pilot pressure input from the pilot pump 33; and an electronic proportional pressure reduction valve 32 for varying an opening degree of a passage connecting the pilot valve 33 and the horse power regulating part 31 according to a magnitude of a current command value input from the controller 60.

Meanwhile, the above-mentioned objects of the present disclosure also may be achieved by a power control method of a construction machine for controlling a hydraulic pump 20 driven by an engine 10, including: calculating a current pump requiring horse power of the hydraulic pump 20; calculating a target pump requiring horse power from a load pressure Pd of a working fluid discharged from the hydraulic pump 20; and gradually increasing a required horse power of the hydraulic pump 20 from the current pump requiring horse power to the target pump requiring horse power for a preset time Δt.

According to an exemplary embodiment of the present disclosure, the power control method may further include: calculating the preset time Δt from a horse power difference value ΔPO between the current pump requiring horse power and the target pump requiring horse power.

According to the present disclosure, an RPM of an engine can be maintained at a target RPM by calculating an engine RPM command value according to an engine load ratio and outputting the calculated engine RPM command value to the engine, making it possible to enhance a fuel efficiency of a construction machine and reduce vibrations.

Further, an equipment control unit to which an engine load ratio is transmitted from an engine control unit calculates an engine RPM command value and outputs the calculated engine RPM command value to the engine control unit, dispersing calculation burden and accordingly making it easy to apply the power control apparatus of the present disclosure to an existing system.

Furthermore, a hydraulic impact generated due to an existing time delay of a constant horse power control point can be prevented by gradually varying a required horse power of a hydraulic pump according to a load pressure. Moreover, an RPM of an engine can be prevented from being abruptly lowered due to a load of a hydraulic pump by preventing a hydraulic impact, making it possible to minimize exhaust fumes and vibrations of the engine.

In addition, while a work efficiency of a construction machine is lowered by abruptly decreasing a required horse power of a hydraulic pump to return an RPM of an engine according to the related art, a required horse power of the hydraulic pump can be gradually increased up to a target pump requiring horse power for a preset time, making it possible unnecessary to return the RPM of the engine, and accordingly, prevent the required horse power of the hydraulic pump from decreasing and thus enhance a work efficiency of a construction machine.

In particular, when a load pressure Pd is a non-load pressure Pd1, a load applied to an engine by a hydraulic pump can be minimized by setting a target pump requiring horse power to a minimum horse power POmin, thereby making it possible to improve fuel efficiency.

Moreover, a discharge flow rate of a hydraulic pump can be secured as high as possible at a time point when a required horse power of the hydraulic pump reaches a target pump requiring horse power by setting a maximum set pressure Pd2 where a target pump requiring horse power becomes a maximum horse power POmax to be lower than or equal to a pressure Pd2 at a constant horse power control start point of the maximum horse power POmax of the hydraulic pump, thereby making it possible to further enhance work efficiency.

In addition, by setting the present time a horse power difference value ΔPO between a current pump requiring horse power of the hydraulic pump and the target pump requiring horse power, horse power can be promptly controlled when the horse power difference value ΔPO is small, and a control time sufficient enough not to generate a hydraulic impact can be secured when the horse power difference value ΔPO is large.

Meanwhile, the spirit of the present disclosure can be commonly applied to a general hydraulic system by constituting a horse power regulating unit with a horse power regulating part and an electronic proportional pressure reduction valve for varying an opening degree of a passage connecting a pilot pump and the horse power regulating part.

10: Engine 20: Hydraulic pump

Figure 1:
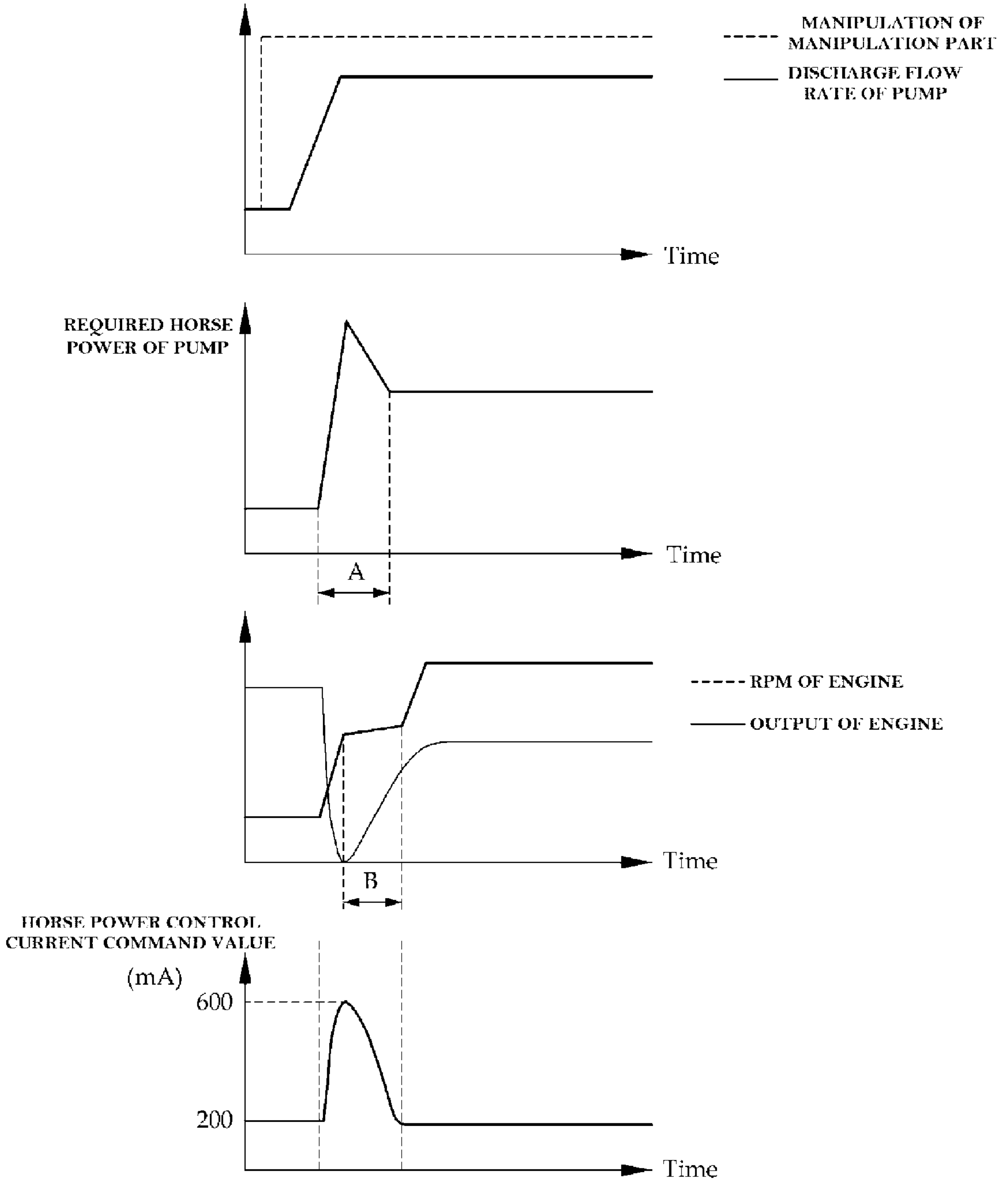
FIG. 1 illustrates graphs schematically illustrating a discharge flow rate and a required horse power of a pump, an output and an RPM of an engine, and an increment rate of a horse power control current command value according to a power control apparatus of the related art in an abrupt manipulation condition of a manipulation part.

30: Horse power regulating unit 31: Horse power regulating part

32: Electronic proportional pressure reduction valve

33: Pilot pump 40: Regulator

50: Pressure sensor 60: Controller

61: Engine control unit 62: Equipment control unit

ΔPO: Horse power difference value Δt: Increase time, Preset time

POmin: Pump minimum horse power POmax: Pump maximum horse power

Pd: Load pressure Pd1: Non-load pressure

Pd2: Maximum set pressure

DETAILED DESCRIPTION

Hereinafter, a power control apparatus of a construction machine according to an exemplary embodiment of the present disclosure will be described in detail with reference to the accompanying drawings.

Figure 4:
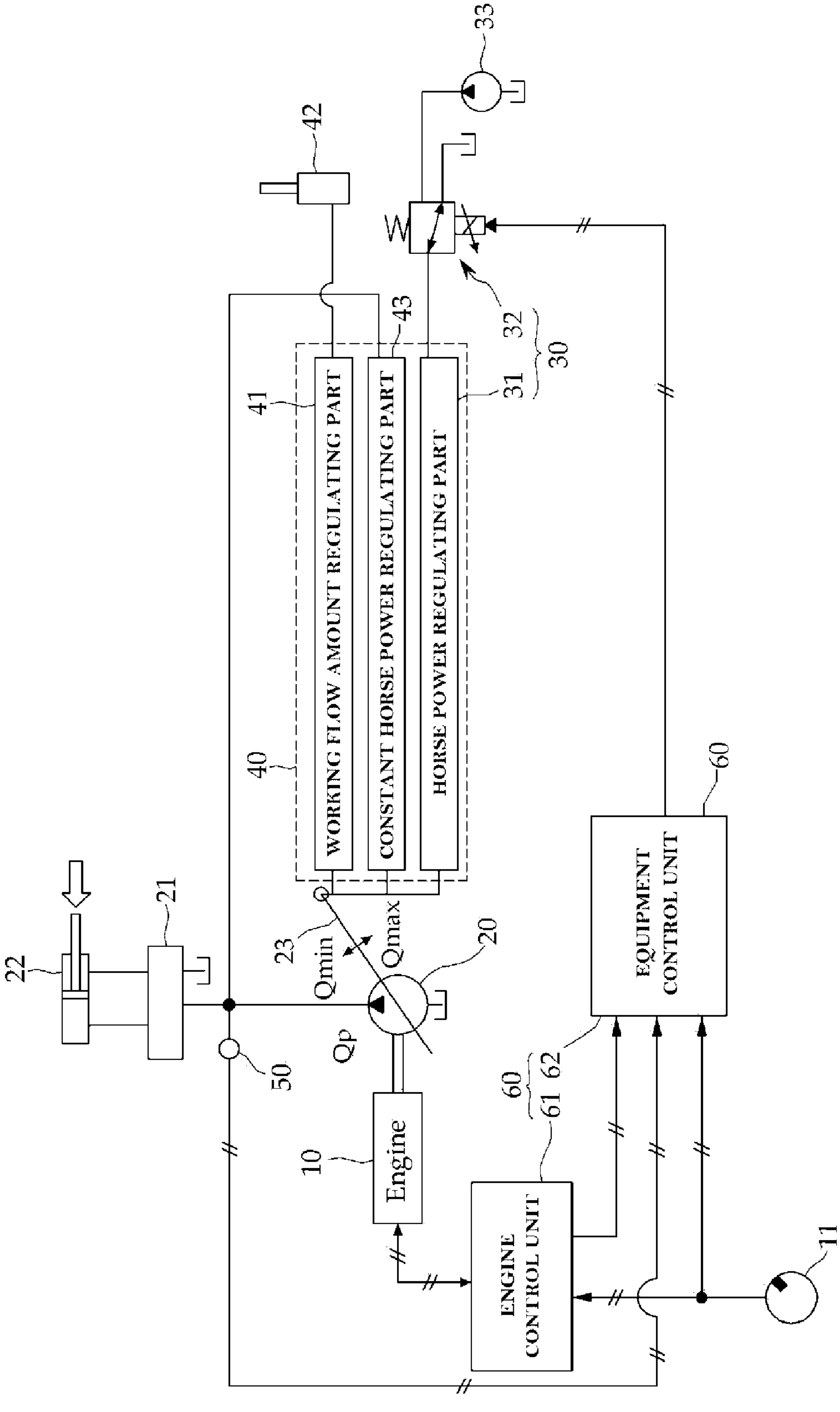
FIG. 4 is a concept view schematically illustrating a power control apparatus of a construction machine according to an exemplary embodiment of the present disclosure.

Referring to FIG. 4, the power control apparatus of a construction machine according to the exemplary embodiment of the present disclosure includes an engine 10 driving a hydraulic pump 20, a horst power regulating unit 30 for varying a swash plate angle of the hydraulic pump 20 to vary a required horse power of the hydraulic pump 20 in response to an input horse power control signal, a pressure sensor 50 for detecting a pressure of a working fluid discharged from the hydraulic pump 20, and a controller 60 for outputting the horse power control signal to the horse power regulating unit 30 and controlling an RPM of an engine as well.

The controller 60 includes an engine control unit 61 such as an electronic control unit (ECU) and an equipment control unit 62.

The engine control unit 61 outputs a fuel injection amount command value to the engine 10 to control an RPM of the engine 10. The engine control unit 61 calculates a load torque of the engine 10 from a current fuel injection amount command value and a current RPM of the engine 10. A maximum torque of the engine for each RPM of the engine is set in the engine. Thus, if a target RPM of the engine is input from a dial gauge 11, the engine control unit 61 may calculate a maximum torque of the engine corresponding to a target RPM. The engine control unit 61 calculates an engine load ratio which is a ratio of a load torque to a maximum torque to output the engine load ratio to the equipment control unit 62.

Figure 5:
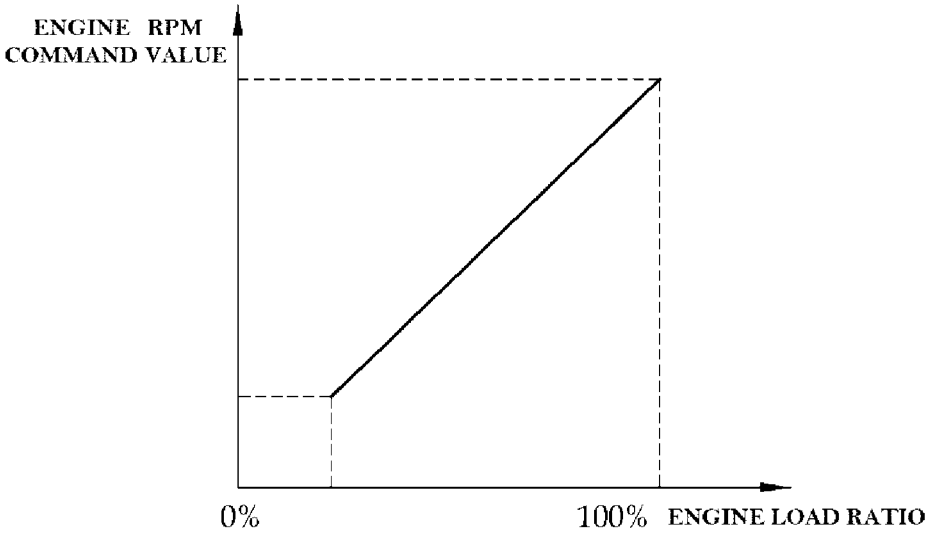
FIG. 5 is a graph schematically illustrating an engine RPM command value according to an engine load ratio set in an equipment control unit of FIG. 4.

As illustrated in FIG. 5, engine RPM command value for an engine load ratio for constantly maintaining an RPM of the engine 10 at an input target RPM is set in the equipment control unit 62. Here, when the target RPM is varied, the engine RPM command value for an engine load ratio is also varied. Thus, the set value illustrated in FIG. 5 is set to be different according to a magnitude of a target RPM of the engine. That is, the set values as illustrated in FIG. 5 are set for target RPMs of the engine and are stored in a memory and the equipment control unit 62.

Thus, if a target RPM of the engine is input to the equipment control unit 62, the equipment control unit 62 selects a pattern corresponding to the input target RPM from the patterns of FIG. 5. Thereafter, the equipment control unit 62 calculates an engine RPM command value corresponding to an load ratio input from the selected pattern and outputs the calculated engine RPM command value to the engine control unit 61. Then, the engine control unit 61 calculates a fuel injection amount command value corresponding to the engine RPM command value and outputs the calculated fuel injection amount command value to the engine 10. Accordingly, an RPM of the engine is controlled. In this case, as illustrated in FIG. 5, as an engine load ratio increases, an engine RPM command value also increases. That is, if a load applied from the hydraulic pump 20 to the engine 10 increases, a fuel injection amount of the engine 10 increases, whereas if a load applied from the hydraulic pump 20 to the engine 10 decreases, a fuel injection amount of the engine 10 decreases.

Figure 6:
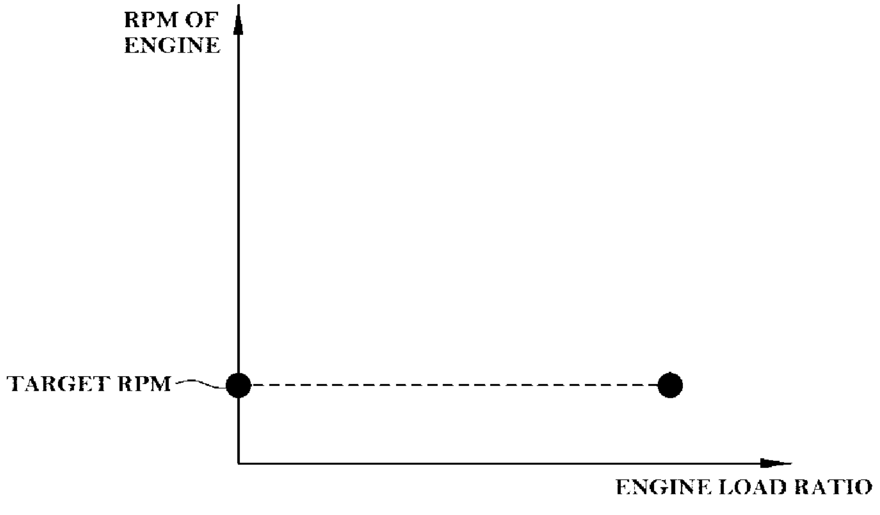
FIG. 6 is a graph schematically illustrating an engine RPM according to an engine load ratio of an engine controlled by the power control apparatus illustrated in FIG. 4.

As a result, as illustrated in FIG. 6, an RPM of the engine 10 is always constantly maintained at a target RPM by controlling a fuel injection amount such that a torque increases according to a load ratio of the engine.

Hereinafter, an RPM control method of the engine having the above-mentioned construction will be described in detail.

Figure 7:
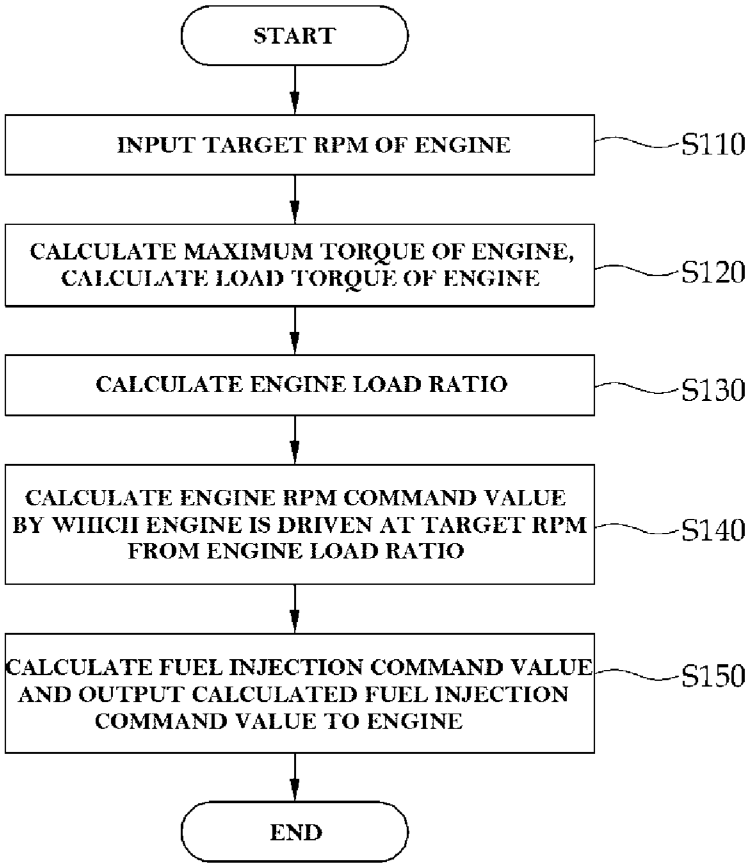
FIG. 7 is a flowchart schematically illustrating a power control process by the power control apparatus illustrated in FIG. 4.

Referring to FIG. 7, first, if an engine target RPM is set by the dial gauge 11, the engine target RPM is transmitted to the engine control unit 61 and the equipment control unit 62 (S110).

Then, the engine control unit 61 calculates an engine maximum torque for the input engine target RPM, and calculates a current engine load torque (S120). Thereafter, the engine control unit 61 calculates an engine load ratio (S130). The engine load ratio is calculated by the following Equation 1.

$$\text{Engine load ratio}(\%) = \frac{\text{Engine load torque}}{\text{Engine maximum torque}} S100 \qquad \text{Equation 1}$$

If the engine load ratio is calculated, the engine control unit 61 outputs the calculated engine load ratio to the equipment control unit 62.

Meanwhile, if an engine target RPM is input from the dial gauge 11, the equipment control unit 62 selects a pattern where an engine RPM command value according to the engine load ratio illustrated in FIG. 5 is set based on the input engine target RPM. Thereafter, the equipment control unit 62 calculates an engine RPM command value corresponding to the engine load ratio output from the engine control unit 61 from the selected pattern as illustrated in FIG. 5. Thereafter, the equipment control unit 62 outputs the calculated engine RPM command value to the engine control unit 61. Then, the engine control unit 61 calculates a fuel injection amount command value from the input engine RPM command value and outputs the calculated fuel injection amount command value to the engine 10 (S150).

The power control apparatus and the power control method through a control of an RPM of an engine have been described until now, and a power control apparatus and a power control method through a control of a hydraulic pump 20 will be described hereinafter.

Referring to FIG. 4, the hydraulic pump 20 is a variable pump for varying a discharge flow rate by regulating an inclination of a swash plate 23, and a regulator 40 for regulating the swash plate 23 is installed in the hydraulic pump 20.

The regulator 40 includes a working flow rate regulating part 41 for varying a discharge flow rate of the hydraulic pump 20 in response to a signal for a manipulation of a manipulation part 42, a constant horse power regulating part 43 for maintaining a required horse power of the hydraulic pump 20 at a constant horse power, and a horse power regulating part 31 for regulating a required horse power of the hydraulic pump 20.

The working flow rate regulating part 41 is adapted to regulate a discharge flow rate of the hydraulic pump 20 in response to a signal corresponding to a manipulation signal of the manipulation part 42, and increases a discharge flow rate of the hydraulic pump 20 in proportion to a magnitude of the manipulation signal of the manipulation part 42. Here, a signal corresponding to a manipulation signal of the manipulation part 42 may include a signal for any one selected from a negative control pressure which is a bypass pressure having passed through a main control valve 21, a positive control pressure which is a pilot pressure according to a manipulation of the manipulation part 42, and a load sensing pressure of each actuator 22.

The constant horse power regulating part 43 is adapted to regulate a discharge flow rate of the hydraulic pump 20 according to a discharge pressure of the hydraulic pump 20 and maintain a required horse power of the hydraulic pump 20 at a constant horse power. Here, the constant horse power is varied by the horse power regulating part 31. Thus, the constant horse power regulating part 43 regulates a discharge flow rate of the hydraulic pump 20 according to a constant horse power line diagram in a current varied state.

The horse power regulating part 31 is adapted to vary a required horse power of the hydraulic pressure 20, and a pilot pressure discharged from a pilot pump 33 is applied to the horse power regulating part 31. Here, an electronic proportional pressure reduction valve 32 is installed between the horse power regulating part 31 and the pilot pump 33, and an opening degree of a passage connecting the pilot pump 33 and the horse power regulating part 31 is regulated by the electronic proportional pressure reduction valve 32. The electronic proportional pressure reduction valve 32 is regulated according to a current command value output from the equipment control unit 62. Thus, the horse power regulating part 31 varies a swash plate angle of the hydraulic pump 20 according to a current command value output from the equipment control unit 62.

In the present exemplary embodiment, the horse power regulating unit 30 is defined to include the horse power regulating part 31 and the electronic proportional pressure reduction valve 32, and the horse power regulating part 31 and the electronic proportional pressure reduction valve 32 may be realized by one electronic proportional pressure reduction valve in contrast with the present exemplary embodiment. Thus, the horse power regulating unit 30 may include the horse power regulating part 31 and the electronic proportional pressure reduction valve 32, and may include one electronic proportional pressure reduction valve in an electronically controlled pump as well.

In describing an operation of the horse power regulating unit 30 in more detail, if a high current command value (for example, 600 mA) is output from the equipment control unit 62 to the electronic proportional pressure reduction valve 32, the electronic proportional pressure reduction valve 32 increases passage opening degrees of the pilot pump 33 and the horse power regulating part 31. Then, the horse power regulating part 31 regulates the swash plate angle to decrease a discharge flow rate of the hydraulic pump 20 so as to decrease a required horse power of the hydraulic pump 20.

On the contrary, if a low current command value (for example, 200 mA) is output to the electronic proportional pressure reduction valve 32, the electronic proportional pressure reduction valve 32 decreases passage opening degrees of the pilot pump 33 and the horse power regulating part 31. Then, the horse power regulating part 31 regulates the swash plate angle to increase a discharge flow rate of the hydraulic pump 20 so as to increase a required horse power of the hydraulic pump 20.

The pressure sensor 50 detects a discharge pressure of the hydraulic pump 20 and transmits the detected discharge pressure to the equipment control unit 62. The discharge pressure of the hydraulic pump 20 can be varied according to a load transferred from the actuator 22 through the main control valve 21 and may be expressed as a load pressure.

The equipment control unit 62 performs the following control function in addition to the above-mentioned control of an engine RPM.

Figure 8:
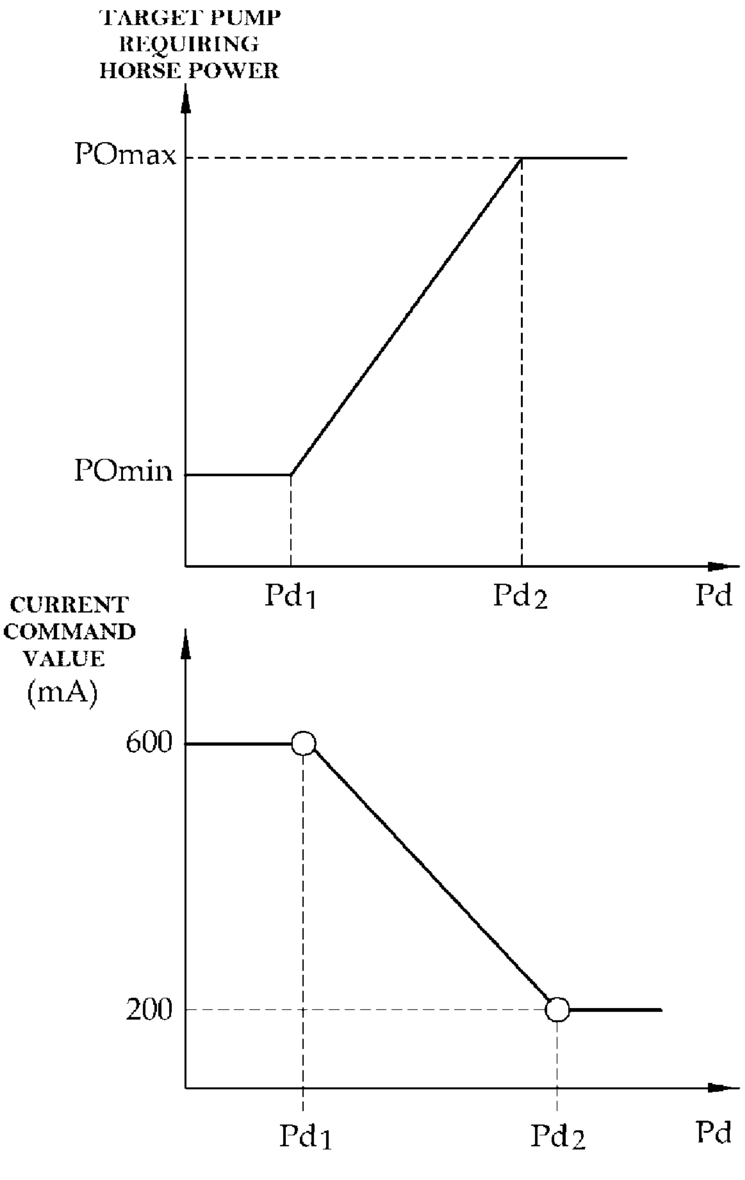
FIG. 8 is a graph schematically illustrating a target pump requiring horse power and a current command value for a load pressure set in a controller of FIG. 3.

The equipment control unit 62 calculates a current command value which will be output to the electronic proportional pressure reduction valve 32 and outputs the calculated current command value to the electronic proportional pressure reduction valve 32. In more detail, a target pump requiring horse power for a load pressure Pd detected by the pressure sensor 50 is set in the equipment control unit 62 as illustrated in FIG. 8. Here, the target pump requiring horse power may be converted into a current command value output to the electronic proportional pressure reduction valve 32. Since the system of the present exemplary embodiment is a negative system by which a required horse power of the hydraulic pump 20 is increased in inverse proportion to the current command value, a current command value and a magnitude of a target pump requiring horse power are varied opposite to each other according to a load pressure Pd in FIG. 8.

Figure 9:
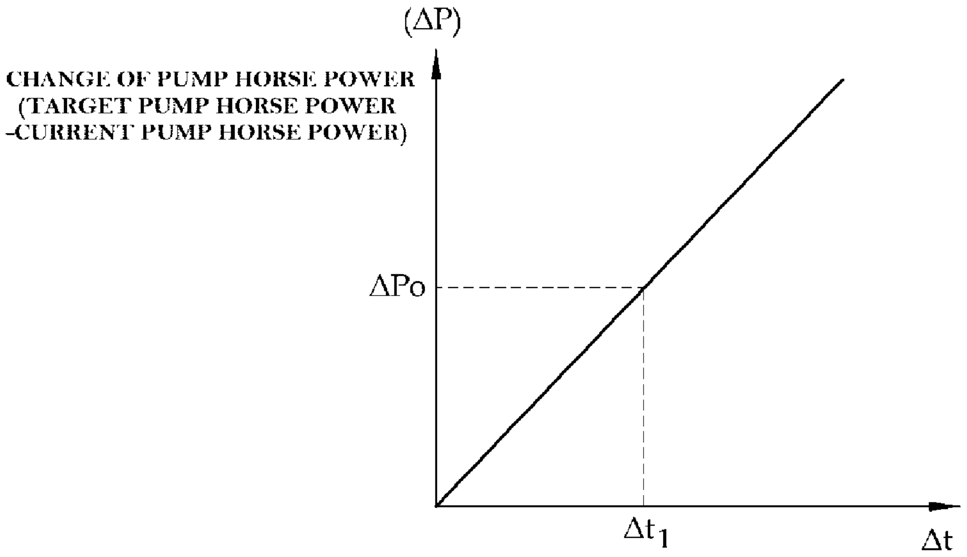
FIG. 9 is a graph schematically illustrating an increase time for a horse power difference value between a target pump requiring horse power set in the controller of FIG. 3 and a current pump requiring horse power.
Figure 10:
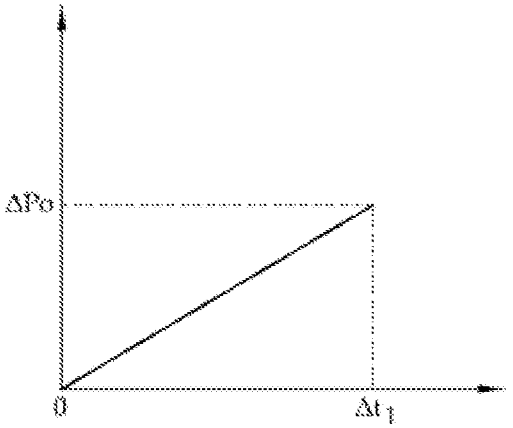
FIG. 10 is a graph schematically illustrating a horse power increase rate for a specific horse power difference value set in the controller of FIG. 4.

As illustrated in FIG. 9, a pump horse power increment rate is set in the equipment control unit 62. The pump horse power increment rate of FIG. 9 represents a time for increasing a current pump requiring horse power of the hydraulic pump 20 to a target pump requiring horse power, and as a horse power difference value ΔPO between the current pump requiring horse power and the target pump requiring horse power increases, a time for increasing a pump requiring horse power is set to increase. As illustrated in FIG. 10, a pump requiring horse power increment rate for a selected specific increase time Δt1 is set in the equipment control unit 62. The pump requiring horse power increment rate of FIG. 10 is a value set for a magnitude of each increase time, and may be stored in the form of a table for increase times.

If a load pressure Pd is input from the pressure sensor 50, the above-described equipment control unit 62 calculates a target pump requiring horse power from the set value of FIG. 8. Thereafter, the equipment control unit 62 calculates a horse power difference value ΔPO between the current pump requiring horse power of the hydraulic pump 20 and the calculated target pump requiring horse power. The current pump requiring horse power of the hydraulic pump 20 may be calculated from the load pressure Pd detected by the pressure sensor 50 and the current swash plate angle of the hydraulic pump 20.

If the horse power difference value ΔPO is calculated, the equipment control unit 62 calculates an increase time Δt from the pump horse power increment rate of FIG. 9. If an increase time Δt is calculated, a horse power increase rate of FIG. 10 is calculated.

If a horse power increase rate is completely calculated, the equipment control unit 62 increases the current pump requiring horse power to the target pump requiring horse power at the calculated increase rate for the calculated increase time Δt. That is, the equipment control unit 62 gradually increases a required horse power of the hydraulic pump 20 to the target pump requiring horse power for a predetermined time.

Figure 11:
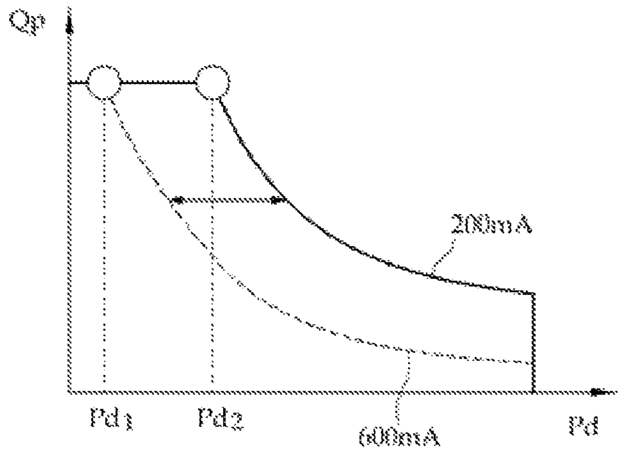
FIG. 11 is a graph schematically illustrating a maximum constant horse power line diagram and a minimum constant horse power line diagram of the hydraulic pump illustrated in FIG. 4.

Meanwhile, as illustrated in FIG. 8, when the load pressure Pd detected by the pressure sensor 50 is a non-load cylinder pressure Pd1, the target pump requiring horse power is set to a minimum horse power POmin, and when the load pressure Pd is a maximum set pressure Pd2, the target pump requiring horse power is set to a maximum horse power POmax. Then, as illustrated in FIG. 11, the maximum set pressure Pd2 is set to be lower than or equal to a constant horse power control start point Pd2 of the maximum horse power POmax of the hydraulic pump 20, whereby a work efficiency of a construction machine can be improved by securing a discharge flow rate of the hydraulic pump 20 as large as possible when a required horse power of the hydraulic pump 20 reaches a target pump requiring horse power.

Hereinafter, a power control method through a control of a hydraulic pump having the above-mentioned construction will be described in detail.

Figure 12:
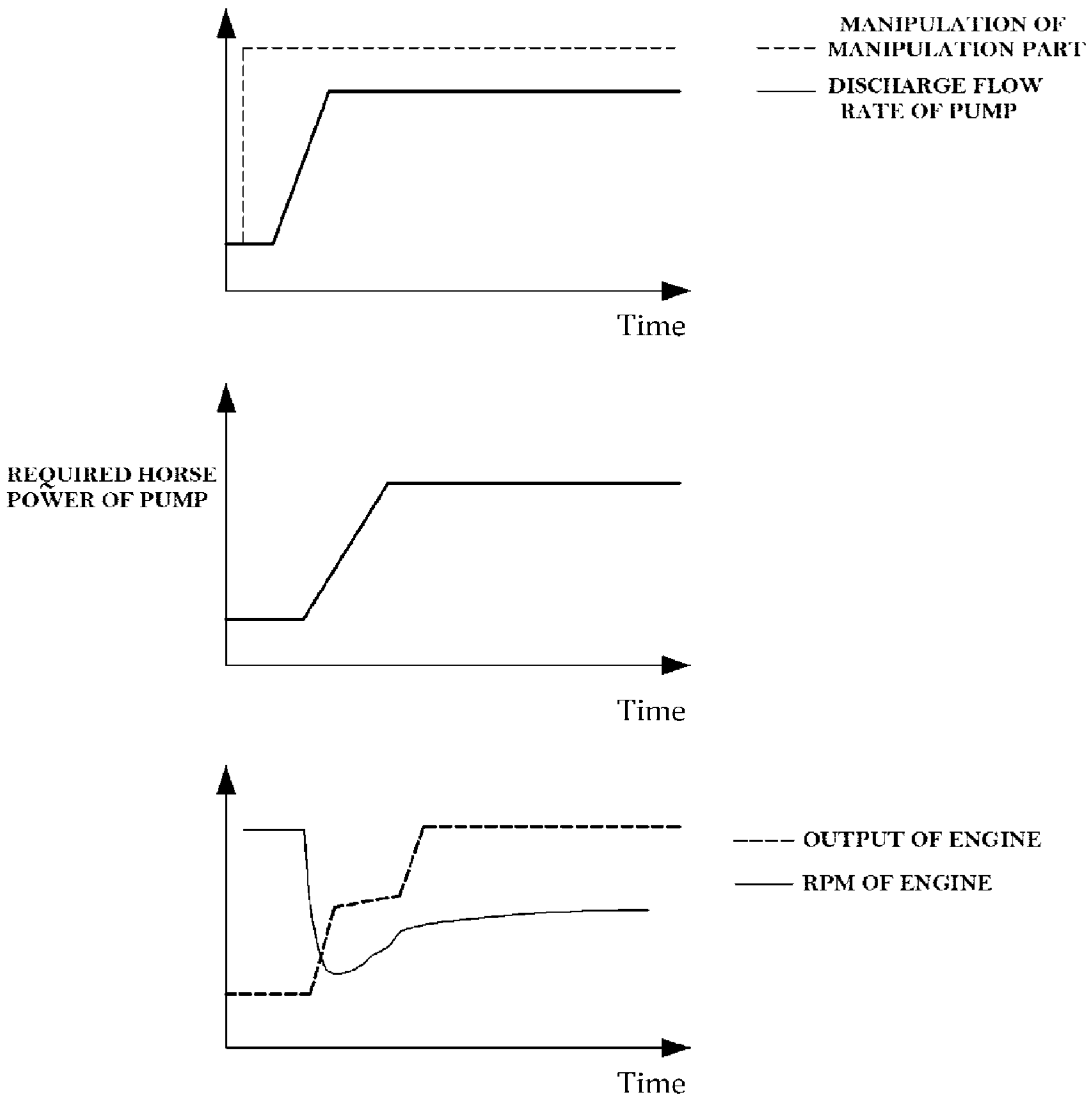
FIG. 12 is a graph schematically illustrating a discharge flow rate and a required horse power of a pump, and an output and an RPM of an engine according to the power control apparatus illustrated in FIG. 4 in an abrupt manipulation condition of a manipulation part.

Referring to FIG. 12, first, the load pressure Pd detected by the pressure sensor 50 is a non-load pressure Pd1 while a manipulation of the manipulation part 42 is not present. If a non-load pressure (Pd1) signal is transmitted to the equipment control unit 62, the equipment control unit 62 calculates the target pump requiring horse power as a minimum horse power POmin from FIG. 8 and outputs a maximum current command value (for example, 600 mA) to the electronic proportional pressure reduction valve 32. Then, the electronic proportional pressure reduction valve 32 maximally opens an opening degree of a passage connecting the horse power regulating part 31 and the pilot pump 33, and accordingly, the horse power regulating part 31 drives the hydraulic pump 20 with a minimum horse power POmin.

In this state, as illustrated in FIG. 12, if a manipulation of the manipulation part 42 abruptly increases, a signal for the manipulation is applied to the working flow rate regulating part 41. Then, the working flow rate regulating part 41 abruptly increases a flow rate of the hydraulic pump 20. However, since the horse power regulating part 31 drives the hydraulic pump 20 with a minimum horse power POmin even if a flow rate abruptly increases, a flow rate neither increases nor decreases abruptly as in the related art. However, in order to increase a driving force of a work apparatus, a required horse power of the hydraulic pump 20 needs to be increased by the horse power regulating part 31.

To this end, an increased load pressure Pd detected by the pressure sensor 50 is input to the equipment control unit 62, which in turn calculates a target pump requiring horse power according to the input load pressure Pd from the set value of FIG. 8. Thereafter, the equipment control unit 62 calculates a horse power difference value ΔPO between a current pump requiring horse power of the hydraulic pump 20 and a target pump requiring horse power, and calculates an increase time Δt and an increase rate for the horse power difference valve ΔPO calculated from the set value illustrated in FIGS. 9 and 10. Thereafter, if the equipment control unit 62 gradually increases the current pump requiring horse power to a target pump requiring horse power calculated at an increase rate calculated for the increase time Δt.

In this way, as the equipment control unit 62 gradually increases the required horse power of the hydraulic pump 20 to the target pump requiring horse power calculated from the minimum horse power POmin, a hydraulic impact is not generated as illustrated in FIG. 12. Further, as illustrated in FIG. 12, exhaust fumes can be minimized by preventing an abrupt decrease of an RPM of an engine and vibrations generated by a decrease of an RPM of the engine can be reduced as well.

Meanwhile, if an RPM of an engine decreases below a target engine RPM set by the dial gauge 11, a work efficiency of a construction machine is lowered by performing a horse power control for minimally lowering a required horse power of the hydraulic pump 20 according to the related art, whereas a decrease of an RPM of an engine is small and a required horse power of the hydraulic pump 20 gradually increases from a minimum horse power to a target pump requiring horse power, thereby enhancing a work efficiency of a construction machine in the present exemplary embodiment.

Figure 2:
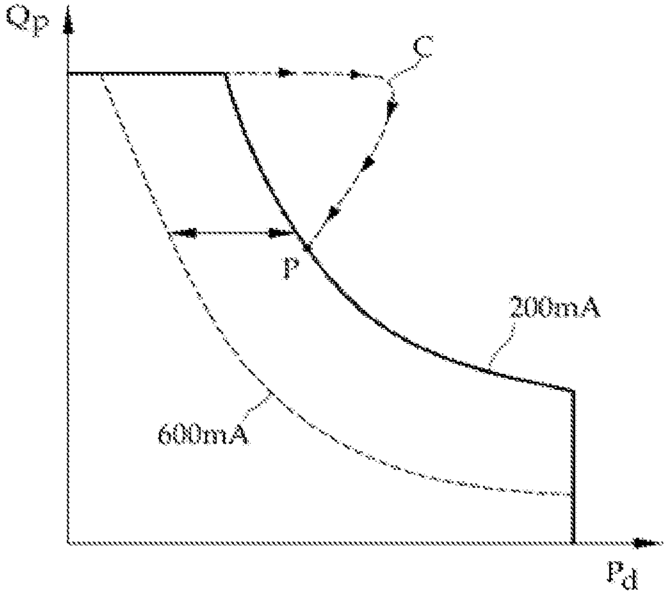
FIG. 2 is a graph illustrating a control process of FIG. 1 in a pressure-flow rate line diagram (constant horse power line diagram) of a hydraulic pump.
Figure 3:
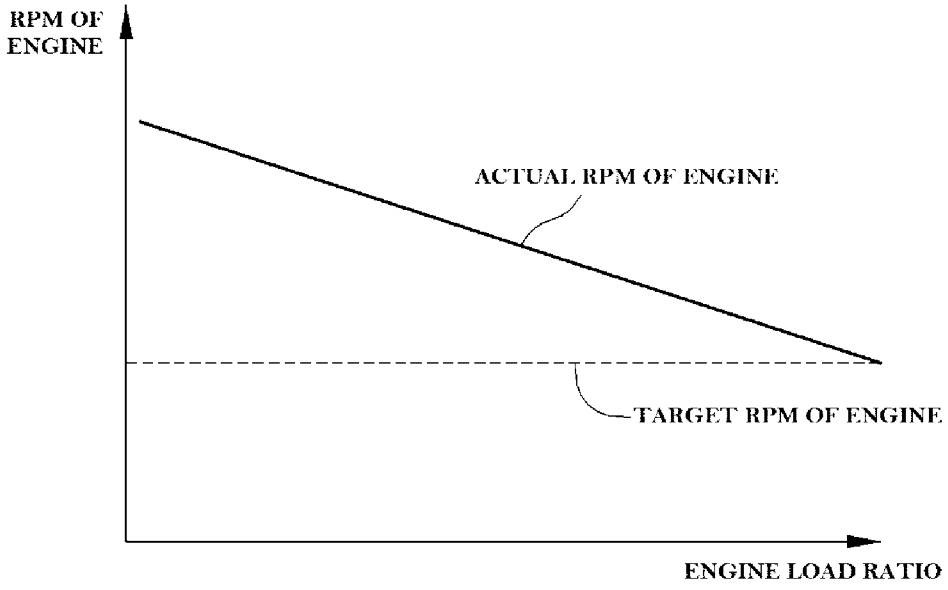
FIG. 3 is a graph schematically illustrating an RPM of an engine according to a load ratio of the engine in the related art.
Figure 13:
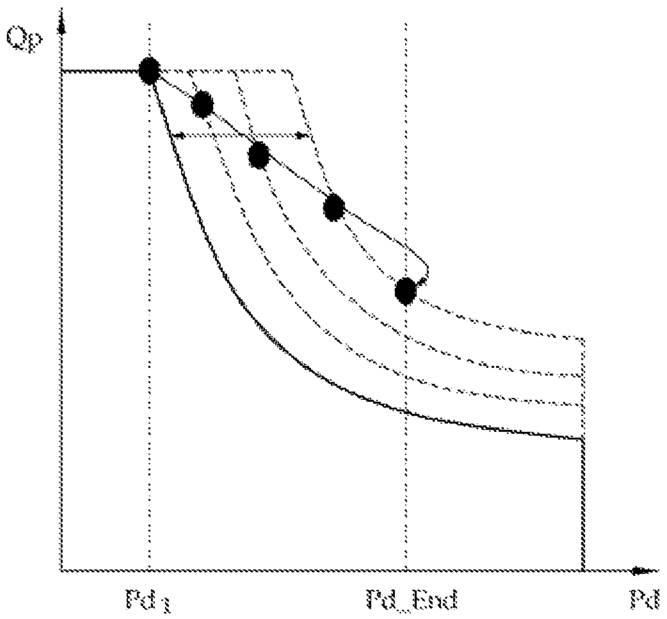
FIG. 13 is a graph illustrating a control process of FIG. 12 in a pressure-flow rate line diagram (constant horse power line diagram) of a hydraulic pump.

Referring to FIG. 13, a process of increasing a horse power of the hydraulic pump 20 from a minimum horse power POmin to a target pump requiring horse power is schematically illustrated in a pressure-flow rate line diagram (constant horse power line diagram). Referring to FIG. 13, the equipment control unit 62 increases a required horse power of the hydraulic pump 20 from a minimum horse power POmin to a target pump requiring horse power for an increase time Δt, and the constant horse power regulating part 43 controls the hydraulic pump 20 at a constant horse power along a varied constant horse power line diagram for the increase time Δt. In this way, it can be seen that as a horse power control and a constant horse power control of the hydraulic pump 20 are simultaneously performed, horse power, flow rate and load pressure are changed according to the line diagram of FIG. 13, thereby making it possible to prevent a hydraulic impact as illustrated in FIG. 2.

Figure 14A:
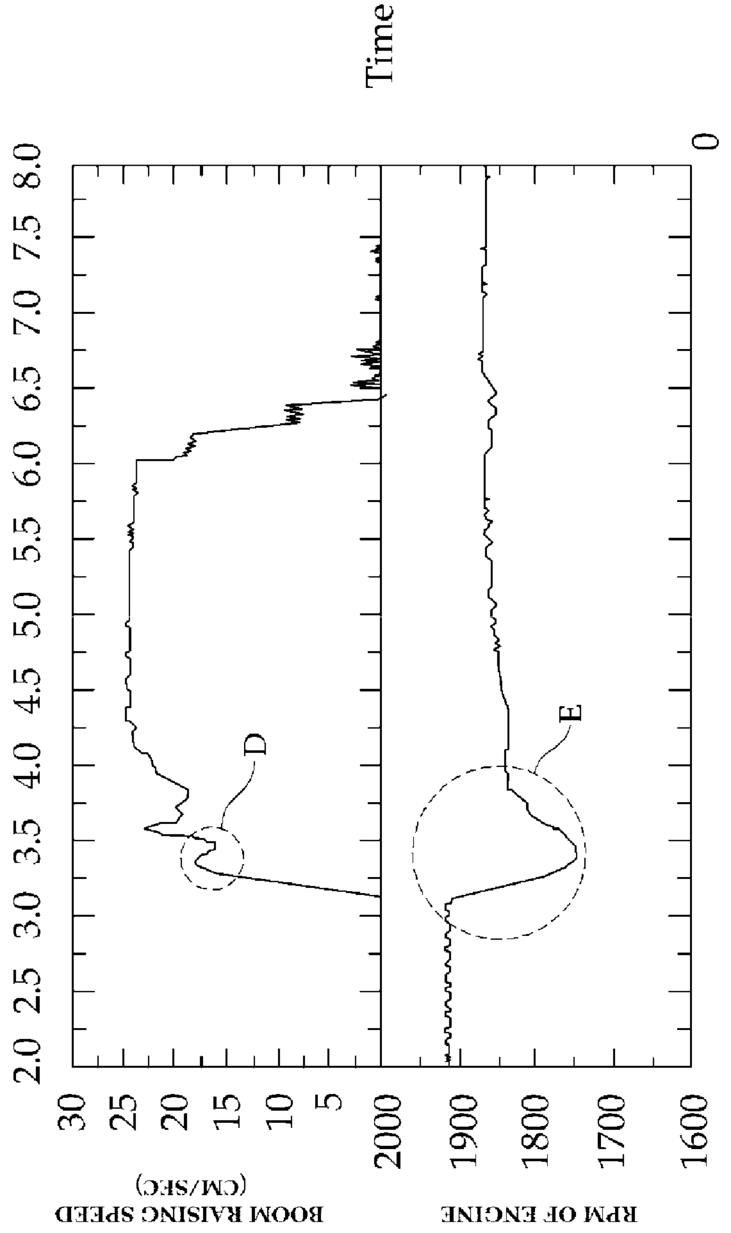
FIG. 14A is a graph illustrating a result obtained by measuring a boom raising speed and an engine RPM according to the control process of FIG. 1.
Figure 14B:
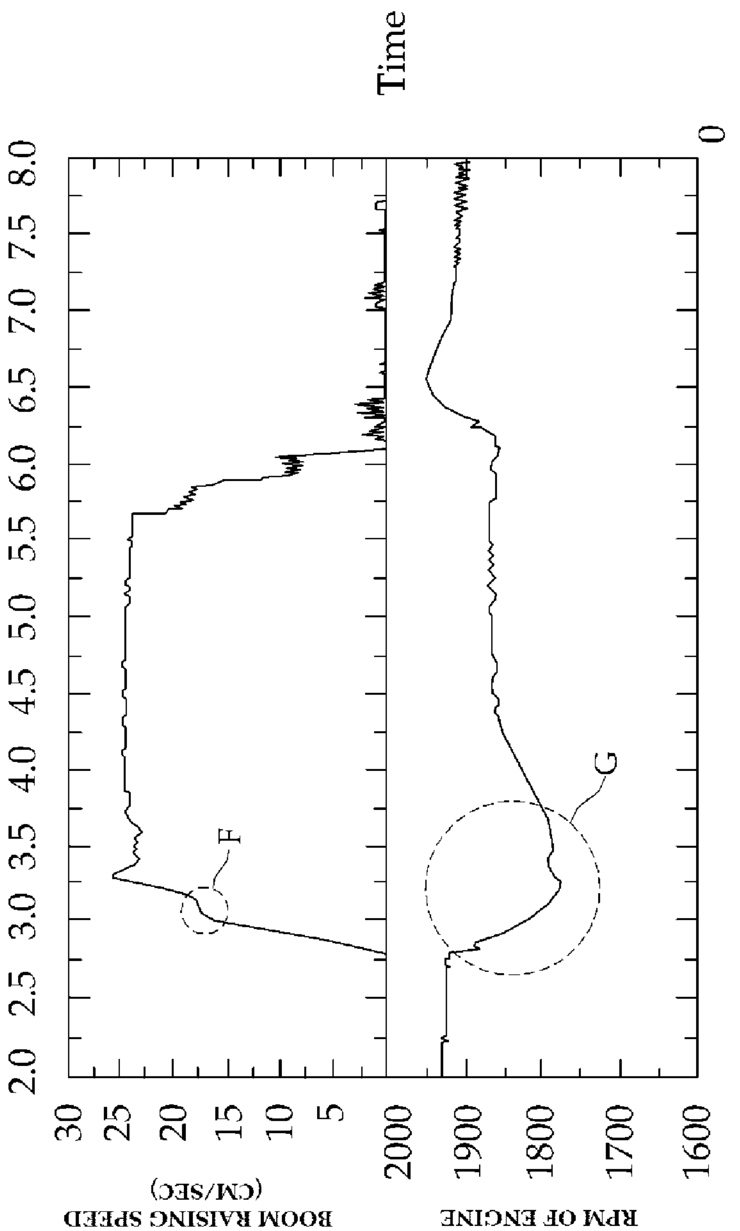
FIG. 14B is a graph illustrating a result obtained by measuring a boom raising speed and an engine RPM according to the control process of FIG. 12.

FIG. 14A illustrates a boom raising speed and an engine RPM by a power control apparatus according to the related art, and FIG. 14B illustrates a boom raising speed and an engine RPM by a power control apparatus according to the present exemplary embodiment.

Referring to FIG. 14A, a boom raising speed abruptly increases as a flow rate and a load pressure increase abruptly. However, the engine RPM is abruptly decreased by a hydraulic impact as in region E, and accordingly, a horse power control is started to lower a required horse power of the hydraulic pump 20 to a minimum horse power. Accordingly, a section where a boom raising speed decreases to the contrary is generated in region D. Thus, a work efficiency of a construction machine is seriously deteriorated, and exhaust fumes and vibrations are increased.

However, referring to FIG. 14B, in the present exemplary embodiment, an increase rate of a boom raising speed is rather low as compared with FIG. 14A, but a boom raising speed is not lowered in section F and an engine RPM is not significantly lowered as in section G. Accordingly, a work efficiency of a construction machine can be enhanced and generation of exhaust fumes and vibrations is minimized.

Meanwhile, when a load pressure increases to a reference pressure so as not to be changed, a horse power control of the hydraulic pump 20 can be performed in consideration of an engine RPM. In addition, even when a load pressure is changed and thus an engine RPM is changed, a horse power control of the hydraulic pump 20 can be performed in consideration of an engine RPM.

Although the present disclosure has been described with reference to exemplary and preferred embodiments, workers skilled in the art will recognize that changes may be made in form and detail without departing from the spirit and scope of the disclosure.

The invention claimed is:

1. The power control apparatus of a construction machine, comprising:

an engine connected to a hydraulic pump to drive the hydraulic pump; and a controller for calculating an engine load ratio defined as a ratio of a load torque of the engine to an engine maximum torque, the engine maximum torque calculated from an input engine target RPM, and the controller calculating an engine RPM command value according to the engine load ratio such that the engine is driven at the target RPM to output the calculated engine load ratio and engine RPM command value to the engine, wherein the controller includes:

an engine control unit for calculating the engine maximum torque from the engine target RPM, calculating the engine load torque from a fuel injection amount command value output to the engine, and calculating the engine load ratio from the calculated engine maximum torque and engine load torque to output the calculated engine maximum torque, engine load torque, and engine load ratio; and an equipment control unit for calculating the engine RPM command value from the engine load ratio output from the engine control unit to output the calculated engine RPM command value to the engine control unit, and wherein the engine control unit calculates the fuel injection amount command value according to the engine RPM command value transmitted from the equipment control unit to output the fuel injection amount command value to the engine.

2. The power control apparatus of claim 1, further comprising:

a horse power regulating unit for varying a swash plate angle of the hydraulic pump to vary a required horse power of the hydraulic pump; and a pressure sensor for detecting a load pressure of a working fluid discharged from the hydraulic pump, wherein the equipment control unit calculates a target pump requiring horse power from the load pressure detected by the pressure sensor, and controls the horse power regulating unit such that a required horse power of the hydraulic pump gradually approaches the target pump requiring horse power for a preset time.

3. The power control apparatus of claim 2, wherein when the load pressure detected by the pressure sensor is a non-load pressure, the target pump requiring horse power is set to a minimum horse power, if the load pressure detected by the pressure sensor is a maximum set pressure, the target pump requiring horse power is set to a maximum horse power, and the maximum set pressure is set to be lower than or equal to a pressure of a constant horse power control starting point of a maximum horse power of the hydraulic pump.

4. The power control apparatus of claim 2, wherein the horse power regulating unit includes:

a horse power regulating part for regulating the swash plate angle of the hydraulic pump according to the pilot pressure input from the pilot pump; and an electronic proportional pressure reduction valve for varying an opening degree of a passage connecting the pilot valve and the horse power regulating part according to a magnitude of a current command value input from the equipment control unit.

5. A power control apparatus of a construction machine for controlling a hydraulic pump driven by an engine, comprising:

a horse power regulating unit for varying a swash plate angle of the hydraulic pump to vary a required horse power of the hydraulic pump;

a pressure sensor for detecting a load pressure of a working fluid discharged from the hydraulic pump; and a controller for calculating a target pump requiring horse power from the load pressure detected by the pressure sensor, and controlling a horse power regulating unit such that a required horse power of the hydraulic pump gradually approaches the target pump requiring horse power for a preset time, wherein when the load pressure detected by the pressure sensor is a non-load pressure, the target pump requiring horse power is set to a maximum horse power, if the load pressure detected by the pressure sensor is a maximum set pressure, the target pump requiring horse power is set to a maximum horse power, and the maximum set pressure is lower than or equal to a pressure of a constant horse power control starting point of the maximum horse power of the hydraulic pump, wherein the preset time $\Delta t$ is proportional to a horse power difference value between a current pump requiring horse power of the hydraulic pump and the target pump requiring horse power.

6. The power control apparatus of claim 5, wherein the horse power regulating unit includes:

a horse power regulating part for regulating the swash plate angle of the hydraulic pump according to the pilot pressure input from the pilot pump; and an electronic proportional pressure reduction valve for varying an opening degree of a passage connecting the pilot valve and the horse power regulating part according to a magnitude of a current command value input from the controller.

* * * * *

UNITED STATES PATENT AND TRADEMARK OFFICE

CERTIFICATE OF CORRECTION

PATENT NO. : 8,720,629 B2
APPLICATION NO. : 13/518743
DATED : May 13, 2014
INVENTOR(S) : Won Sun Sohn et al.

It is certified that error appears in the above-identified patent and that said Letters Patent is hereby corrected as shown below:

In the Claims

Column 14

Line 14, delete “maximum” and insert --minimum--

Signed and Sealed this
Twenty-eighth Day of October, 2014

Michelle K. Lee

Michelle K. Lee
*Deputy Director of the United States Patent and Trademark Office*